United States Patent [19]
Nestler et al.

[11] 3,828,694
[45] Aug. 13, 1974

[54] ADJUSTMENT- AND ARRESTING MECHANISM ESPECIALLY FOR A DRAFTING TABLE

[75] Inventors: Richard Nestler, Lahr; Peter Doetsch, Altdrossenfeld, both of Germany

[73] Assignee: Massstabfabrik Schaffhausen AG, Schaffhausen, Switzerland

[22] Filed: Jan. 18, 1971

[21] Appl. No.: 107,047

[30] Foreign Application Priority Data
Jan. 19, 1970  Switzerland................... 706/70

[52] U.S. Cl................ 108/10, 188/300, 248/157, 248/378, 248/400
[51] Int. Cl. ........................................ A47f 5/12
[58] Field of Search ....... 188/300, 319; 248/354 H, 248/378, 400, 162, 157, 371; 269/254 D; 108/10, 7, 6; 297/347

[56] References Cited
UNITED STATES PATENTS

| | | | |
|---|---|---|---|
| 2,228,865 | 1/1941 | Bird | 188/300 X |
| 3,388,883 | 6/1968 | Axthammer et al. | 248/354 H X |
| 3,438,606 | 4/1969 | Rubin | 248/415 |
| 3,471,140 | 10/1969 | Ballard | 188/300 X |
| 3,563,349 | 2/1971 | Spieth et al. | 188/300 |

FOREIGN PATENTS OR APPLICATIONS

| | | | |
|---|---|---|---|
| 1,219,024 | 12/1959 | France | 108/7 |
| 1,264,077 | 5/1961 | France | 108/10 |
| 1,335,582 | 7/1963 | France | 108/7 |
| 1,168,373 | 10/1969 | Great Britain | 108/6 |

*Primary Examiner*—George E. A. Halvosa
*Attorney, Agent, or Firm*—Craig & Antonelli

[57] ABSTRACT

There is disclosed an adjustment and arresting mechanism, especially for a drafting table, although other uses are contemplated, wherein adjustments are to be carried out substantially along a straight line and/or about at least one axis. The mechanism of the invention comprises an adjustment and arresting cylinder for each adjustment to be performed along the aforementioned straight line or about the aforementioned axis, each such cylinder possesses a predetermined swept volume filled with a fluid medium. Furthermore, piston arrangement is provided for each such cylinder and includes a piston rod and a double-acting piston member within the associated cylinder for subdividing the swept volume into two partial chambers. There are also provided means defining a communication channel between both of the partial chambers to permit the flow of the fluid medium from one partial chamber to the other and shut-off valve means for such communication channel. The cylinder is operatively connected with one of two relatively movable members while the piston rod is operatively connected with the other of two relatively movable members.

17 Claims, 8 Drawing Figures

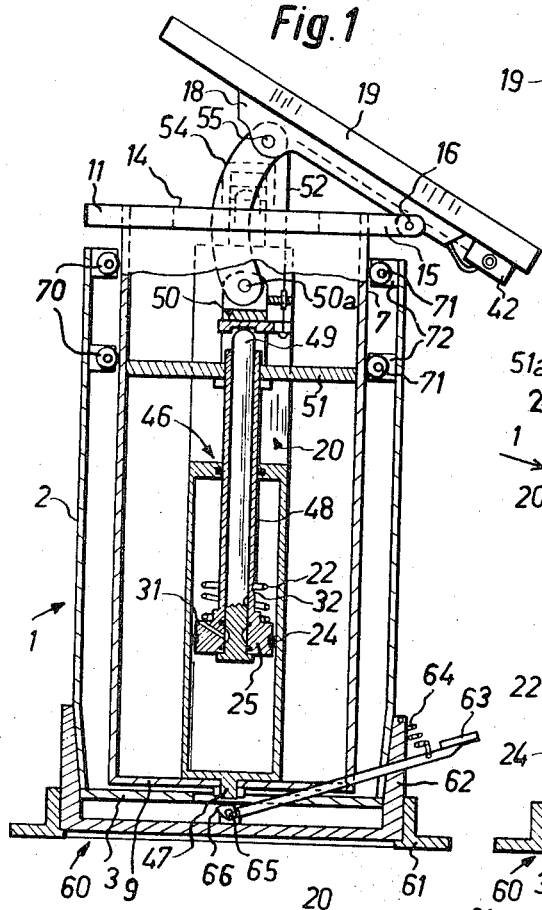
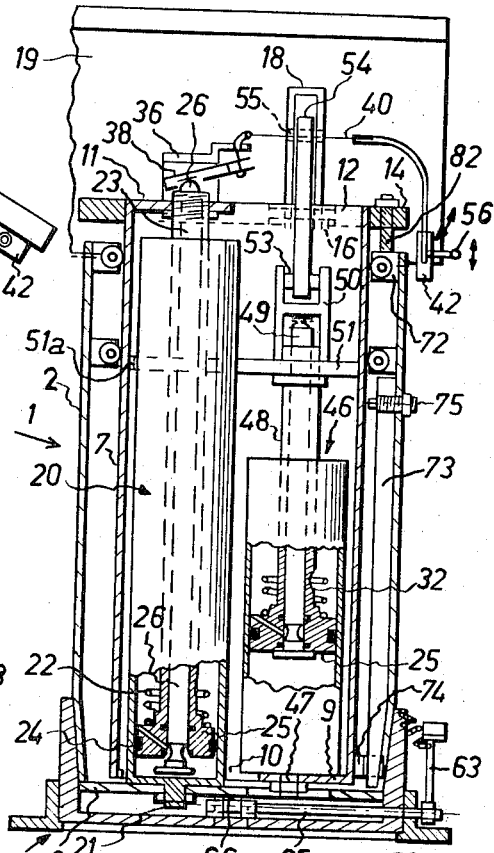
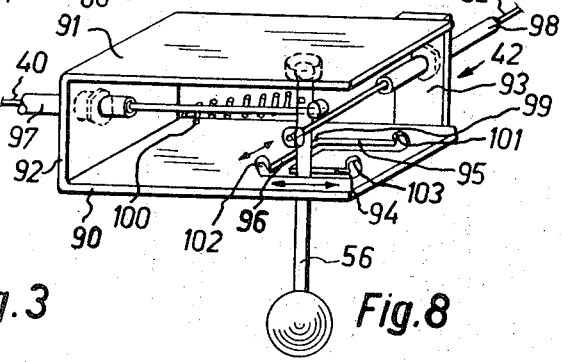
Fig.1
Fig.2
Fig.3
Fig.8
INVENTORS
RICHARD NESTLER
AND PETER DOETSCH
BY Craig, Antonelli, Stewart & Hill
ATTORNEYS

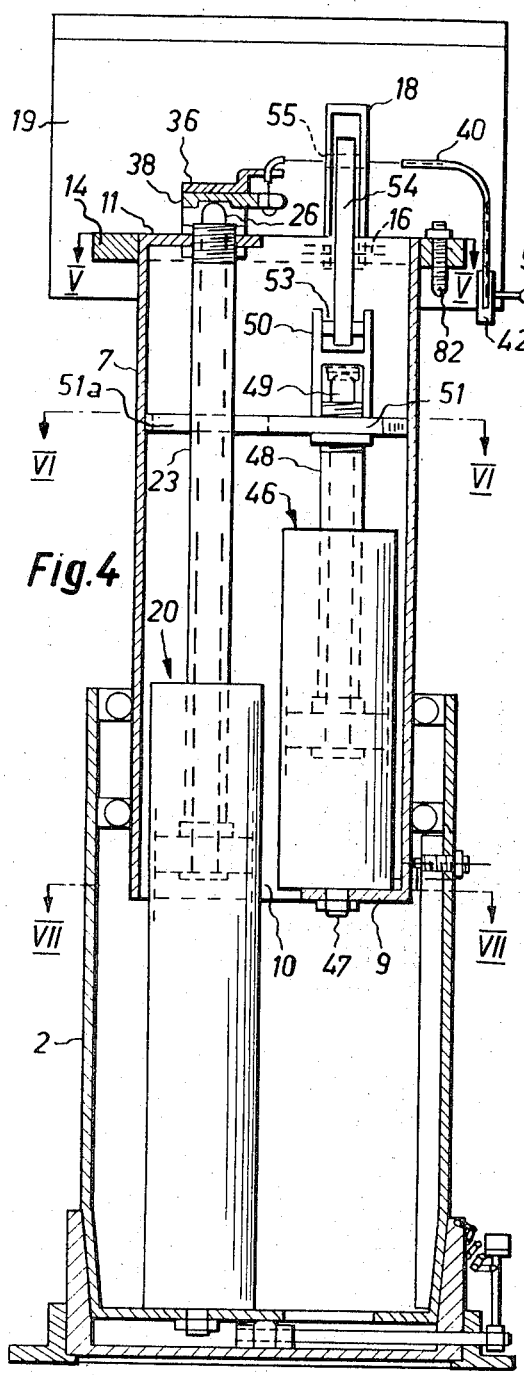
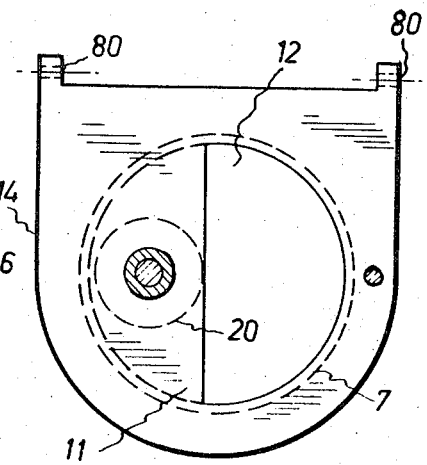
Fig.5
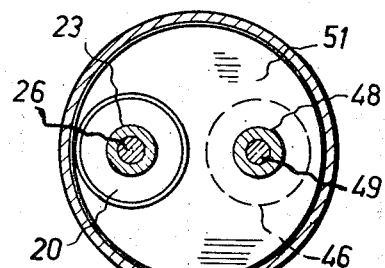
Fig.6
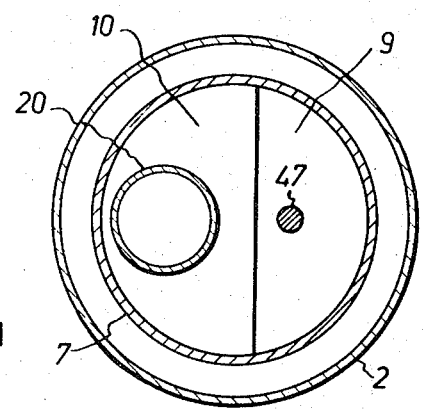
Fig.7

ADJUSTMENT- AND ARRESTING MECHANISM ESPECIALLY FOR A DRAFTING TABLE

BACKGROUND OF THE INVENTION

The present invention relates to a new and improved adjustment- and arresting mechanism, especially for a drafting table, wherein adjustments are to be undertaken at least along a straight line or linear path and/or about at least one axis.

In a great number of the state-of-the-art adjustable stands or frames, such as, for instance, drawing stands equipped with counterweights or with a hydraulic telescopic support arrangement, there is always required, apart from the adjustment mechanism, a separate arresting mechanism.

Not only does this increase the space requirements, weight and costs of the adjustable stand, but, additionally, it oftentimes represents a further possible source of malfunction. Because of the great static or rest load and the large forces required for actuation of these operating mechanisms, the stand and such mechanisms are particularly subjected to great wear. Accordingly, the arresting mechanism is to be considered as a critical component of the adjustment mechanism, and particular attention must be paid thereto during assembly and overhauling thereof. Finally, it is also to be mentioned that actuation of the arresting or stop mechanism unnecessarily overly complicates operation and use of the stand structure.

SUMMARY OF THE INVENTION

Accordingly, there is still present a real need in the art for an adjustment- and arresting mechanism which is not associated with the aforementioned drawbacks of the prior art structures. Hence, a primary objective of this invention is directed to the provision of an adjustment- and arresting mechanism which reliably and effectively overcomes these drawbacks.

Another and more specific object of the present invention relates to the provision of a mechanism of the type described which enables performance of both adjustment and arresting operations by very simple means.

Still a further significant object of the present invention relates to an improved adjustment- and arresting mechanism, especially for drafting or drawing tables or stands, although other uses are contemplated, which is relatively simple in construction, economical to manufacture, easy to install and service, robust in construction, thereby providing longevity in use, not readily subject to breakdown, and enables quick, easy and accurate adjustment and locking or arresting operations to be readily performed.

Now, in order to implement these and still further objects of the invention, which will become more readily apparent as the description proceeds, the inventive adjustment- and arresting mechanism is manifested by the features that for each adjustment along a straight line or about an axis there is provided an adjustment- and arresting cylinder, the swept volume or piston displacement chamber is filled with a fluid medium and subdivided into two partial chambers or compartments by a double-acting piston. A communication or connecting channel is provided for the flow of the fluid medium between both partial chambers or partial compartments. The flow communication channel can be closed by means of a shut-off valve, and the cylinder housing is coupled with one element and the piston rod with the other element of a pair of relatively movable elements.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically illustrates in side view a preferred embodiment of adjustment- and arresting mechanism provided at an elevationally displaceable and tiltable drafting table, with portions thereof broken away to expose specific internal structure;

FIG. 2 is a rear view of the drafting table depicted in FIG. 1, again having portions thereof broken away to expose internal structure;

FIG. 3 is an enlarged view of a detail of the drafting table structure of FIG. 2;

FIG. 4 is a view of the drafting table similar to the showing of FIG. 2, but this time depicting such table in its extended condition;

FIG. 5 is a top plan view of the drafting table of FIG. 4, as viewed substantially along the line V—V thereof;

FIG. 6 is a cross-sectional view of the drafting table of FIG. 4, taken substantially along the line VI—VI thereof;

FIG. 7 is a cross-sectional view of the drafting table of FIG. 4, taken substantially along the line VII—VII thereof; and FIG. 8 is a perspective view of an actuation block for two Bowden cables.

DETAILED DESCRIPTION OF THE PREFERRED EMBODIMENTS

Referring now to the drawings, the drafting stand depicted in FIGS. 1 and 2 will be seen to comprise a vertically disposed or upright telescopic column 1 incorporating a stationary telescopic lower portion 2 and a telescopic upper portion 7 which is displaceably guided for movement in vertical direction within the stationary telescopic lower portion 2. Telescopic lower portion 2 is advantageously formed of any suitable metallic material. It possesses a substantially circular cylindrical outer surface or jacket and at its lower end is closed by a base plate 3 secured to the outer wall or jacket thereof.

Furthermore, this stationary telescopic lower portion 2 is detachably inserted within a socket or pedestal 60. Socket 60 possesses a lower portion or base 61 secured to the floor and an insert 62 located in this base 61. It will be recognized that the lower end portion of the telescopic lower portion 2 is constructed in the form of a downwardly tapering truncated cone which is clampingly inserted into a complementary shaped recess of the insert 62 of the socket or pedestal 60.

In order to release the clamping action prevailing between the telescopic lower portion 2 and the socket 60 and to raise this telescopic lower portion 2 out of the socket 60 a lifting mechanism equipped with a foot pedal 63 is provided at socket 60. A spring 64 anchored to the insert 62 of the socket 60 engages with the free end region of the foot pedal 63, as best shown by referring to FIG. 1. The inner end of the foot pedal 63 is fixed to the outer end of a rod 65 rotatably mounted at the insert 62. This rod 65 extends beneath the telescopic column 1 up to about the central region of the insert 62, carrying at its inner end an eccentric cam 66 cooperating with the floor or bottom 3 of the telescopic lower portion 2.

In order to assemble the telescopic column 1 and the socket or pedestal 60, this telescopic column is manually lifted somewhat over the socket 60 and then permitted to drop into such socket. The clamping connection between the telescopic column 1 and the socket 60 is thus established, both parts being fixedly wedged into one another. In order to release the clamping connection the user of the equipment must exert a force by means of his foot at the outer or free end of the foot pedal 63 and, thus, downwardly depress such foot pedal against the action of the spring 64. This movement results in rotation of the eccentric cam 66. Cam 66 thus contacts the floor or bottom 3 of the telescopic lower portion 2, lifting the telescopic column 1 out of the insert 62, so that it can thereafter be readily completely removed from the socket 60.

The telescopic upper portion 7 located within the telescopic lower portion 2 is likewise fabricated from metal. It possesses a substantially circular cylindrical jacket or outer wall, the diameter of which is somewhat smaller than the diameter of the jecket or wall of the telescopic lower portion 2. Furthermore, telescopic upper portion 7 possesses a base plate 9 having a recess 10 and a cover plate 11 likewise provided with a recess 12. As best observed by referring to FIG. 2, these recesses 10 and 12 of the base plate 9 and the cover plate 11 are offset with respect to one another.

To ensure for guiding of the telescopic upper portion 7 at the telescopic lower portion 2, guide rollers 70 arranged in two planes which are spaced from one another are provided at the region neighboring the upper end of the telescopic lower portion 2. In each such roller plane, there are distributively arranged about the periphery of the inner wall of the telescopic lower portion 2 a number of such guide rollers or rolls 70. These rollers 70 are rotatably mounted in each case upon an eccentric pin of horizontally extending shafts 71, serving as guide means for the telescopic upper portion 7. The shafts 71 are mounted in bearing blocks 72 arranged at the wall of the telescopic lower portion 2. Hence, they are displaceable from the outside about each desired angle of rotation and can be fixed in each rotational position at the telescopic lower portion 2. By rotating the shafts 71, it is therefore possible to displace the rolls 70 seated upon an eccentric pin of the associated shaft both towards and away from the telescopic upper portion 7. Therefore, this expedient renders it possible to dispense with the use of precision tubular elements for the telescopic components, and quite to the contrary, inexpensive, commercially available tubes or tubular elements can be successfully utilized. Any possible differences can be compensated for by appropriate adjustment of these guide rolls 70 as previously explained. Hence, even with non-precise manufactured tubes, it is possible to achieve a large stroke adjustment. These rollers 70 furthermore preferably are formed of a suitable plastic material having a self-lubricating effect.

For the purpose of securing the telescopic upper portion 7 against rotation, a vertical ledge 73 is mounted at the inside wall of the jacket of the telescopic lower portion 2. At the lower end of the telescopic upper portion 7, there is mounted a substantially U-shaped counterpiece 74 which engages with play over the ledge member 73 and during vertical movement of the telescopic upper portion 7, this counterpiece 74 is guided along the ledge member 73, affording the desired security against rotation of the telescopic upper portion.

Now, in order to limit the movement of the telescopic upper portion 7 in an upward direction, there is threadably connected to the side wall of the telescopic lower portion 2 a limit or stop screw 75 against which impacts the counterpiece 74 when the telescopic upper portion 7 has reached its upper terminal position.

Continuing, it will be seen that at the upper edge of the telescopic upper portion 7 there is arranged a plate-shaped frame member 14. Two eyelets 80 for a shaft 16 protrude from this substantially plate-shaped frame member 14 in the direction of the user of the equipment, such best being recognized by also referring to FIGS. 4 and 5. A screw 82, shown particularly well in FIGS. 2 and 4, is threaded into the frame member 14, screw 82 serving to limit the movement of the telescopic upper portion 7 in downward direction, and to this end, cooperating with one of the upper bearing blocks 72 mounted at the inner wall of the telescopic lower portion 2.

A base plate 18 is pivotably carried or mounted at the shaft member 16, and a drafting board 19 is anchored to the pivotal base plate 18 by any suitable non-illustrated means.

As best seen by referring to FIG. 2, at the base plate 3 of the telescopic lower portion 2 there is fixedly threadably connected the base plate of a first adjustment- and arresting cylinder 20 which is vertically disposed within the telescopic lower portion 2, and the threaded attachment previously discussed being undertaken by means of a threaded pin or plug 21 which protrudes outwardly from the cylinder 20 and is substantially coaxially located with respect thereto. This cylinder 20 possesses approximately the same height as the telescopic lower portion 2 and is filled with a suitable pressurized medium, an inert gas for instance.

Within the cylinder 20, there is provided a piston arrangement 23, 25. More precisely, it will be seen that the piston rod 23 which extends substantially coaxially with respect to the lengthwise axis of the cylinder 20 has an outer end equipped with external threading, by means of which this piston rod can be fixedly attached to the cover plate 11 of the telescopic upper portion 7. The inner end of this piston rod 23 is coaxially connected with the double-acting piston member 25. Piston member 25 carries a piston ring 24 at its periphery. Further, a short braking spring 22 coaxially bears against the upper face of the piston member 25, and somewhat above the piston member 25 itself the piston rod 23 is provided with an external notch or grooving 32.

Now, the piston member 25 will be seen to subdivide the cylinder compartment or piston displacement chamber of the cylinder 20 into an upper and a lower partial compartment or partial chamber. Both of these partial compartments are filled with the pressurized fluid medium.

Now, as best observed by referring to FIG. 3, a continuous axial bore 81 extends through the piston rod 23 and the piston member 25. Now, at the inner wall of this bore 81, there are provided two coaxial annular or ring-shaped grooves, which may be machined into the wall of this bore, these ring-shaped grooves serving as seats for two sliding sealing rings 29, 29a. Also, from the inner wall of the axial bore, there extends through the interior of the piston member 25 a connection or communication channel 31 which leads to the upper partial compartment or chamber of the cylinder 20.

Now, also in this axial bore 81, there is slidably arranged for displacement a valve shaft 26 which extends past both ends of the continuous bore 81 and which can be displaced between a blocking or rest position and a work position. The lower end of this valve shaft 26 is connected with a coaxial impact plate 27, the outer diameter of which is larger than the inner diameter of the axial bore 81.

Directly above the impact plate 27 the valve shaft 26 is provided with a coaxial, substantially hour glass-like constricted portion 28. This constricted portion 28 is arranged at such a height that it always communicates with the inner opening of the connection channel 31 and in the closed position of the valve shaft 26, such constricted portion 28 is disposed between both of the slide sealing rings 29, 29a.

As best observed by referring to FIGS. 2 and 4, the upper end of the valve shaft or stem 26 protruding out of the piston rod 23 is covered by a Bowden cable head 36 attached by any suitable non-illustrated means to the cover plate 11 of the telescopic portion 7. A Bowden cable lever 38 is pivotably mounted at the Bowden cable head 36, this cable lever 38 being movable about a pivot axis between a rest position and a work position, as will be more fully explained hereinafter. Further, Bowden cable lever 38 has one end bearing against the upper terminal portion or end of the valve stem 26 and its other end engages with a Bowden control cable or wire 40. Now in FIG. 2, the Bowden cable lever 38 and the valve shaft or stem 26 have been illustrated in their work position while in FIG. 4 these components have been shown in their rest position.

The other end of the Bowden control cable 40 operatively communicates with an actuation mechanism 42. This actuation mechanism 42 is connected by any suitable and therefore not particularly represented means to the rear face off the drafting board 19 in such a fashion that the outer end of a manually operable lever 56 forming a part of the actuation mechanism 42 protrudes towards the outside past the edge of the drafting board 19, as best evidenced by referring to FIG. 4.

Continuing, it will be recognized that a second adjustment- and arresting cylinder 46 which includes a base plate is fixedly threadably secured by means of a substantially coaxial threaded pin 47 protruding towards the outside from its base plate, to the base plate 9 of the telescopic upper portion 7. The connection is undertaken such that the base plate of the cylinder 46 bears against the base plate 9 of the telescopic upper portion 7. This second cylinder 46 primarily differs from the first cylinder 20 only by virtue of its smaller height.

A bifurcated or forked member 50 is threadably connected at the upper end of the piston rod 48 which, for this purpose, is equipped with external threading. This bifurcated member 50 will be understood to be equipped with a substantially circular-shaped guide plate 51 which slides along the internal wall of the telescopic upper portion 7. Guide plate 51 is arranged parallel to both end plates or walls of the second cylinder 46 and possesses a recess 51a for receiving the first cylinder 20. As best observed by referring to FIG. 1, the forked or bifurcated member 50 simultaneously functions as a Bowden control cable head for a second Bowden control cable 52, the other end of which is connected with the actuation block or actuation mechanism 42.

A shaft member 53 will be seen to extend through both of the coaxially arranged eyelets 50a of the forked ends of the bifurcated member 50 which extend towards the outside in the direction of lift. One end of a bent arcuate-shaped pivot lever 54 is rockably or pivotably mounted at this shaft member 53, particular attention in this connection being invited to FIGS. 2 and 4. The other end of this pivot lever 54 is pivotably mounted in spaced relationship from the shaft 16 upon a further shaft member 55 arranged at the base plate 18, in other words the anchoring support, of the drafting board 19.

FIG. 5 illustrates a top plan view of the telescopic column arrangement at the location of the upper boundary of the telescopic upper portion 7. Furthermore, this particular figure shows specifically the recess 12 provided at the cover plate 11 of the telescopic upper portion 7 which allows the through-passage of the bifurcated member 50 and the pivot lever 54 of the second cylinder 46, elements 50, 54 and 46 having been conveniently omitted from this figure to preserve clarity in illustration.

FIG. 6 illustrates the manner in which the guide plate 51 of the bifurcated element 50 is accommodated in such a manner to the circular-configured internal cross-sectional area of the telescopic upper portion 7 that it prevents the piston rod 48 from canting.

FIG. 7 illustrates the manner in which the recess 10 at the base plate 9 of the telescopic upper portion 7 allows for the throughpassage of the first cylinder 20.

Finally, FIG. 8 illustrates details of the actuation mechanism or block 42 accommodated at the underside of the drafting table. This actuation block 42 will be understood to possess a housing arrangement having two parallel walls 90 and 91 and two side walls 92 and 93 which are not only parallel to one another but also perpendicular to the first-mentioned parallel walls 90 and 91. A substantially U-shaped guide groove incorporating two parallel legs 94, 95 and an interconnecting section 96 perpendicular to the parallel guide legs 94, 95 is provided at the one wall 90. The actuation lever 56 is mounted in ball- and socket-like fashion at one end in the wall 91 at a location which is disposed above the substantially U-shaped guide groove arrangement 94-96, this actuation lever 56 extending through the guide groove arrangement 94-96 located at the other wall 90 and out of the housing of the actuation block 42. Both of the Bowden cables or wires 40 and 52 are guided through guide tubes 97 and 98, respectively, secured to the respective side walls 92 and 93 into the interior of the actuation block 42. The ends of both of these Bowden cables 40 and 52 are conveniently attached with the actuation lever 56. The guide tube 98 for the Bowden cable 52 is disposed substantially parallel to the leg section 96 of the guide groove arrangement 94-96, while the other guide tube 97 for the Bowden cable 40 is disposed parallel to the guide legs 94, 95 of the guide groove arrangement 94-96. In fact, the entire construction is undertaken in such a manner that the neutral position of the actuation lever 56, that is, that position where the actuation lever 56 does not exert any tractional force upon both Bowden cables, is located at the point of intersection 99 of the leg 95 with the leg section 96 of the guide groove arrangement 94-96. In this position, the valve units of the cylinders 20 and 46 are closed and the pistons and piston rods thereof are thus arrested in their position. A spring 100 engages with the actuation lever 56 and strives to pull this lever 56 into the neutral position 99.

Upon shifting the actuation lever 56 from its neutral position in the direction of the end of the guide groove leg 95, the Bowden cable 40 is subjected to a tractional force and the valve arrangement of the cylinder 20 for the elevational displacement is opened. At the end of the leg 95, the guide groove arrangement possesses a flexed tongue or tail 101 into which there can releaseably lockingly engage the actuation lever 56 to retain such in the shifted position.

Upon shifting or displacement of the lever 56 from its neutral position in the direction of the other end of the guide leg section 96 of the guide groove arrangement the other Bowden cable 52 is placed under tension and the valve of the other cylinder 46 for the inclined adjustment of the load is opened. Similarly, at the last-mentioned end of the guide groove section 96, there is also provided a flexed tail or tongue 102 into which this actuation lever 56 can releaseably lockingly engage to retain the latter in the shifted position.

Now, upon shifting of the lever 56, starting from the last-mentioned position, to the end of the guide groove leg 94 there is simultaneously now also placed under traction the other Bowden cable 40 and the valve arrangement of the cylinder 20 for the elevational adjustment or displacement is opened. This actuation lever 56 can be releaseably lockingly engaged in the last-mentioned position, in which the valve units of both cylinders are now opened, through the provision of a similar flexed tail or tongue 103 of the guide groove arrangement 94-96. Moreover, the spring member 100 engaging with the actuation lever 56 likewise strives to retain this actuation lever at the momentary tongue of the guide groove arrangement 94-96 with which such actuation lever temporarily engages.

Having now had the benefit of the general description of the preferred embodiment of inventive adjustment- and arresting mechanism, as such has been described by way of example in conjunction with a drafting stand, the mode of operation will now be considered in detail, and is as follows.

Both of the adjustment- and arresting cylinders 20, 46 which are mounted at the telescopic column arrangement, 2, 7 are associated with different modes of movement of the drafting table 19, which, however, are blocked in the rest position in that the valve units within the associated pistons of both cylinders 20 and 46 are forced into their blocking position by virtue of the pressure difference prevailing between the medium and the outside space. This will be explained more fully hereinafter in conjunction with the first cylinder unit 20 provided for the elevational displacement of the drafting stand.

To this end, it will be understood that atmospheric pressure acts upon the upper end of the valve shaft or stem 26 which is slidingly guided within the axial bore of the piston rod 23, whereas the much greater pressure of the fluid medium enclosed within the swept volume or displacement chamber of the cylinder 20 acts upon the cross-section of the piston rod 23. As a result, the valve shaft 26 is forced into its highest position against the force of gravity, yet without resorting to any additional auxiliary means, such as for instance, return springs. This position constitutes a blocking position since the sliding packing or sealing ring 29 which provides a channel seal with respect to the lower partial chamber of the swept volume or displacement chamber of the cylinder is totally effective. Since the piston rod sealing arrangement, piston ring 24 and the valve shaft seal 29a are permanently effective, the piston 25, the telescopic upper portion 7 secured to its piston rod 23 and therefore, of course, also the frame 14 and the shaft 16 are blocked as concerns their elevational adjustability.

Now, whenever it is necessary to carry out an elevational adjustment of the drafting stand, this prevailing blocking action just explained above can be released in a very simple fashion by exerting a tensional force upon the Bowden wire or cable 40. This tensional or traction force is converted by means of the Bowden cable lever 38, constructed as a pivotal lever, into a mechanical force or pressure which acts vertically from above downwardly upon the valve stem or shaft 26. This mechanical pressure acts against the restoring force of the valve shaft 26 brought about by the above-explained pressure difference, forcing this valve stem 26 to assume its lower position. This lower position constitutes the working position for the valve unit within the piston arrangement since the sliding ring seal 29 now no longer sealingly contacts the valve shaft or stem 26, because of the constricted portion 28, and the communication channel 31 now is in flow communication with the lower partial chamber or region of the swept volume or displacement chamber of the cylinder 20. Consequently, the fluid medium which is enclosed within this swept volume of the cylinder 20 can flow between the upper and lower partial chamber regions.

Owing to the overpressure of approximately equal magnitude which prevails in both partial chambers, the overflow from one chamber to the other only then occurs if there is exerted a pull or push manually at the drafting board 19 in a direction parallel to the piston rod 23. This pulling or pushing force only requires very little effort since the weight of the telescopic upper portion 7 and the vertical components of all of the loads carried thereby or supported thereby are compensated by the overpressure of the fluid medium acting upon the piston rod cross-section. The small throughflow of the connection or communication channel 31 and the internal friction of the fluid medium reduces the attainable adjustment speed to such an extent that the adjustment can occur with the desired degree of precision.

This overpressure fulfills still a further or second function, namely it constitutes a replacement for the otherwise conventional counterweight in every position of balancing of the weight of the overall system. During both functions, the compressability of the fluid medium plays a role in that it reduces the hardness or shock action of the movements and provides protection against oscillation and coarse loading.

The actuation block 42 is arranged at such a location of the described embodiment of drafting stand that it can be easily and readily reached by the hand of the user, without however hindering the drafting work. As schematically indicated in FIG. 2 by both of the double-headed arrows, both of the main actuation tracks along which the manual actuation lever 56 is movable are designed and positioned in such a fashion that the direction of each track is correlated to the relevant adjustment movement of the drafting board 19.

To permit the fluid medium which has been filled into the cylinder with the maximum practically permissible pressure to accommodate to the load at the momentarily applied location, there are advantageously provided within the relevant cylinder the brake spring 22 and the external notching 32 at the associated piston rod.

The mode of operation of the cylinder 46 provided for the tilting movement of the drafting board 19 is the same as for the cylinder 20 serving for the elevational displacement thereof. The primary difference resides in the manner of coupling the components. Whereas the outer end of the piston rod 23 of the cylinder 20 was rigidly connected or coupled with the telescopic upper portion 7, the piston rod 48 is hingedly connected with the load 18, 19. The pivotal movement of the drafting board 19 which has been hingedly or pivotably mounted at the shaft 16 is produced by virtue of the coaction of the piston rod 48 with the pivot lever 54 in toggle-like fashion.

For the same reasons as explained above, here also the expenditure of force during tilting of the drafting board 19 manually is just as small as was the case curing the elevational displacement of the drafting board. The vertical components of the forces acting upon the piston rod 48 are balanced out by the overpressure acting upon the cross-sectional surface area of the piston rod 23. This same overpressure causes the valve shaft 49 of the piston rod 48 to be forced into its most elevated or highest position. The valve shaft 49 is only then forced out of this locking rest position into its unblocking work position by exerting a pull upon the associated second Bowden cable or wire 52.

If both cylinders 20 and 46 are successively or simultaneously displaced in the above-described manner by means of the actuation block or actuation mechanism depicted in FIG. 8, then, the drafting board 19 can assume any random elevated and angular position within the limits of the constructional design. One primary advantage of the equipment is that for each of both adjustments slight finger pressure is sufficient since the overpressure acting upon the cross-sectional surface of the piston rod 23 brings about weight equilibrium. The adjustment operation is infinite, does not require any drive and is free of noise, and the actuation mechanism can be provided at the most convenient accessible location of the drafting board. In this manner, there is achieved with very simple means the most profound operating comfort.

A further advantage of the invention resides in the fact that there can be dispensed with the use of any counterweight and a special stop or arresting mechanism which previously was located at less accessible locations of the drafting stand and was subjected to a pronounced continual load. In contrast to the compensation or balancing springs which were conveniently used in the prior art, when required, there should here be particularly mentioned that the inventive construction is free of fatigue- and maintenance, possesses a high overloadability as well as an almost ideal force-displacement path of the adjustment- and arresting cylinder means 20 and 46 which can be considered as a special construction of a gas spring. A particularly noteworthy superiority of the inventive design in contrast to the use of a steel spring resides in the possibility of shifting the characteristic force-displacement path by simply changing the internal pressure of the cylinders and thereby accommodating the equipment to the momentarily encountered load. In this manner, the same gas spring can be employed as a universal component of an entire manufactured series for the most different fields of use.

Yet a further important advantage of this invention resides in the most extensive protective arrangement of the components, which also afford a compact and weight-saving arrangement, and specifically, by virtue of the fact that the hollow space of the telescopic column arrangement is effectively used for the installation and mounting of two adjustment- and arresting cylinders. Therefore, the adjustment cylinders which are rather sensitive are also very effectively protectively mounted. There is thus obtained a compact construction which can be placed on the market as an integral unit and to which the purchaser can mount any desired object which is to be adjusted with respect to height and inclination.

Different constructional forms are possible for the shut-off valve unit. The greatest selection is afforded if the connection or communication channel is disposed outside of the cylinder body and connects in by-pass fashion both partial chambers. In order to shut off such a connection or communication channel there can be used practically all commercially available shut-off valves which do not exhibit any reactive or blind flow, and which can be subjected to a sufficient number of load changes.

Also, the design of the valve structure within the piston can be accommodated to the momentary conditions and requirements. Finally, instead of using an inert gas as such has been conveniently chosen by way of example for the described embodiment, it is also possible to use a different pressurized gas or even a liquid, such as for instance an oil-water emulsion, which then serves as the fluid medium. This fluid medium is preferably at a pressure greater than atmospheric pressure.

In the described embodiment, there was used a force cylinder, the force of which can be lowered. However, there can also be used force cylinders, the force of which can be selectively raised or lowered. If it is necessary to prevent the presence of the internal pressure of the fluid medium in one of these cylinders, then it is merely necessary to completely extend the piston rod against the action of the brake spring 22. As a result, the outer notching 32 arrives at the region of the piston rod seal or packing which has been mounted at the upper cover plate of the cylinder, so that the medium contained within the upper partial chamber of the swept volume of the cylinder can escape into the surroundings.

The described apparatus can also be used successfully for vises which are to be elevationally displaced or adjusted. Also, the adjustment- and arresting or lock mechanism of the invention can be used for a blackboard or similar type structure. In such case, however, there is omitted the cylinder arrangement 46 for the inclined adjustments. The blackboard can then be directly mounted to the frame unit 14 and must only then be guided along a vertical guide arrangement. The foregoing constitute but few of some of the additional uses to which the inventive adjustment- and arresting mechanism can be put, and others will obviously suggest themselves from the description given heretofore as to the construction and mode of operation thereof.

While there is shown and described present preferred embodiments of the invention, it is to be distinctly understood that the invention is not limited thereto but may be otherwise variously embodied and practiced within the scope of the following claims.

Accordingly, what is claimed is:

1. An adjustment and arresting mechanism, for a load, particularly for a drafting table, wherein adjustments are to be carried out substantially along a straight line and/or about at least one axis, comprising an adjustment and arresting cylinder provided for elevational adjustment of the load and an adjustment and arresting cylinder for inclined adjustment of the load, each of said cylinders possessing a predetermined swept volume filled with a fluid medium, a piston arrangement including a piston rod and a double-acting piston member within said cylinder for subdividing said volume into two partial chambers, means defining a communication channel between both said partial chambers to permit the flow of the fluid medium therebetween, shut-off valve means for said communication channel, two members which are to be moved relative to one another associated with each of said cylinders, means for operatively connecting respective ones of said cylinders with one of said members, means for operatively connecting the piston rod associated with a respective cylinder with the other of said members, actuating means for said shut-off valve means, said actuating means incorporating a Bowden cable for each shut-off valve means of the respective cylinders, a common manually operable element for engagement by the Bowden cables of both of the adjustment and arresting cylinders, and means defining a number of tracks along which there can be moved said manually operable element, said track defining means providing three track sections forming a substantially U-shaped track arrangement, a neutral position of said manually operable element corresponding to a closed condition of said shut-off valve means for said cylinders being located at a point of intersection of two of said track sections, whereas movement of said manually operable element along said track sections exerts a traction force upon the one, the other, or all of said Bowden cables and thus opens the associated shut-off valve means.

2. An adjustment and arresting mechanism for a table comprising:

a relatively fixed part, a relatively movable part, first adjustment means for adjusting said table along a substantially straight line, said first adjustment means including a first cylinder with a first piston slidably disposed therein to form a fluid spring with pressurized fluid in said cylinder which is communicable with opposite sides of said first piston by way of a first valve means such that said first piston and first cylinder are freely movable with respect to one another when said first valve means is open and such that said first piston and first cylinder are locked relatively immovably with respect to one another by said pressurized fluid when said first valve means is closed, one of said first cylinder and first piston being connected to said fixed part and the other of said first cylinder and first piston being connected to said movable part such that relative movement of said first cylinder and first piston is accompanied by corresponding relative linear adjusting movement of said fixed and movable parts, second adjusting means for pivotally adjusting said table about at least one axis, said second adjustment means including a second cylinder with a second piston slidably disposed therein to form a fluid spring with pressurized fluid in said cylinder which is communicable with opposite sides of said second piston by way of second valve means such that said second piston and second cylinder are freely movable with respect to one another when said second valve means is open and such that said second piston and second cylinder are locked relatively immovably with respect to one another by said pressurized fluid when said second valve means is closed, one of said second cylinder and second piston being connected to said movable part and the other of said second cylinder and second piston being connected to said table such that relative movement of said second cylinder and second piston is accompanied by corresponding relative pivotal adjusting movement of said table with respect to said movable part, and manually operable valve control means for selectively moving said first and second valve means between open and closed positions, wherein said valve control means includes a single manually operable element operatively connected to both said first and second valve means such that selective opening of either or both of said first and second valve means can be effected by movement of said single element, and wherein said valve control means includes a guide track for guiding movement of said single element between a plurality of positions corresponding respectively to: opening of said first valve means with said second valve means closed, opening of said second valve means with said first valve means closed, both valve means closed, and both valve means open.

3. A mechanism according to claim 2, wherein said valve control means includes means for normally holding said single element in a neutral position with both of said valve means closed.

4. A mechanism according to claim 2, wherein said valve control means includes a first Bowden cable leading from said single element to a member controlling said first valve means, and a second Bowden cable leading from said single element to a member controlling said second valve means.

5. A mechanism according to claim 2, wherein said track includes three track sections forming a substantially U-shaped track arrangement, a neutral position of said single element corresponding to the closed condition of both valve means being located at the point of intersection of two of said track sections.

6. A mechanism according to claim 2, wherein said first cylinder is fixed to said fixed part and said second cylinder is fixed to said displaceable part.

7. A mechanism according to claim 2, wherein said table is a drafting table.

8. A mechanism according to claim 2, wherein each of said fluid springs is a gas spring which is constructed as a closed unit with a constant total supply of compressed gas above atmospheric pressure in the respective cylinders for all adjustment positions of said table and with said valve means only serving to transfer portions of said compressed gas between cylinder chambers at opposite sides of the respective cylinders.

9. A mechanism according to claim 2, wherein said guide track includes locking detent means for maintaining said single element in each of said plurality of positions.

10. A mechanism according to claim 9, wherein said valve control means includes means for automatically returning said single element to a neutral position with both of said valve means closed whenever said single element is out of engagement with said locking detent means.

11. A mechanism according to claim 10, wherein said first and second cylinders are arranged alongside one another and are spaced from one another in a direction transverse to said lengthwise axis.

12. A mechanism according to claim 9, wherein said valve control means includes a first Bowden cable leading from said single element to a member controlling said first valve means, and a second Bowden cable leading from said single element to a member controlling said second valve means.

13. A mechanism according to claim 12, wherein said valve control means includes means for automatically returning said single element to a neutral position with both of said valve means closed whenever said single element is out of engagement with said locking detent means.

14. A mechanism according to claim 2, wherein said fixed and movable parts are constructed as telescoping parts with said movable parts being movable along a lengthwise axis, and wherein said first piston and first cylinder as well as said second piston and second cylinder are movable respectively with respect to one another along axes parallel to said lengthwise axis, said second piston being pivotally connected to said table.

15. A mechanism according to claim 14, wherein said first and second cylinders are arranged alongside one another and are spaced from one another in a direction transverse to said lengthwise axis.

16. A mechanism according to claim 14, wherein said first cylinder is fixed to said fixed part and said second cylinder is fixed to said displaceable part.

17. A mechanism according to claim 14, wherein said valve control means includes a first Bowden cable leading from said single element to a member controlling said first valve means, and a second Bowden cable leading from said single element to a member controlling said second valve means.

* * * * *